United States Patent
Oh et al.

(10) Patent No.: US 10,093,080 B2
(45) Date of Patent: Oct. 9, 2018

(54) FUNCTIONAL FILM FOR IMPROVING IMPREGNATION PROPERTIES OF COMPOSITE MATERIAL AND METHOD FOR MANUFACTURING COMPOSITE MATERIAL USING SAME

(71) Applicant: LG Hausys, Ltd., Seoul (KR)

(72) Inventors: Ae Ri Oh, Anyang-si (KR); Gi Hune Jung, Bucheon-si (KR); Tae-Hwa Lee, Gwangmyeong-si (KR); Yong-Hoon Yoon, Daejeon (KR); Hee-June Kim, Seongnam-si (KR); Jae-Hoon Choi, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 590 days.

(21) Appl. No.: 14/430,451

(22) PCT Filed: Sep. 27, 2013

(86) PCT No.: PCT/KR2013/008655
§ 371 (c)(1),
(2) Date: Mar. 23, 2015

(87) PCT Pub. No.: WO2014/054868
PCT Pub. Date: Apr. 10, 2014

(65) Prior Publication Data
US 2015/0224751 A1    Aug. 13, 2015

(30) Foreign Application Priority Data

Oct. 4, 2012    (KR) .................. 10-2012-0109963

(51) Int. Cl.
*B32B 27/12*    (2006.01)
*B29C 70/54*    (2006.01)
(Continued)

(52) U.S. Cl.
CPC .............. *B32B 27/12* (2013.01); *B29C 35/08* (2013.01); *B29C 70/547* (2013.01); *B32B 5/02* (2013.01);
(Continued)

(58) Field of Classification Search
CPC ....................................................... B32B 27/12
See application file for complete search history.

(56) References Cited

U.S. PATENT DOCUMENTS 3,784,433 A * 1/1974 Garnish .................. B29C 70/04
156/176
4,604,319 A * 8/1986 Evans ................... B29C 70/086
428/113
(Continued)

FOREIGN PATENT DOCUMENTS

CN      1651513 A     8/2005
JP      H07195362 A   8/1995
(Continued)

OTHER PUBLICATIONS

Taiwanese Office Action dated Dec. 14, 2016 in connection with the counterpart Taiwanese Patent Application No. 102136057.
(Continued)

*Primary Examiner* — Andrew T Piziali
(74) *Attorney, Agent, or Firm* — Hauptman Ham, LLP

(57) ABSTRACT

Disclosed are a film for forming a composite material, which is capable of improving impregnation properties by using a carrier film on which a low viscosity resin layer is formed, and a method for manufacturing a composite material using the same. The film for forming a composite material, according to the present invention, comprises: a continuous fibrous layer; and a carrier film which is adhered to any one side of the continuous fibrous layer and has a low viscosity resin layer formed on the adhered side of the continuous fibrous (Continued)

layer. Thus, the present invention provides the advantage of having a composite material with excellent impregnation properties and excellent mechanical performance.

5 Claims, 4 Drawing Sheets

(51) Int. Cl.
 *B32B 5/02* (2006.01)
 *B29C 35/08* (2006.01)
 *B60R 19/03* (2006.01)
(52) U.S. Cl.
 CPC ........... *B29C 2035/0827* (2013.01); *B32B 2262/0269* (2013.01); *B32B 2262/101* (2013.01); *B32B 2262/106* (2013.01); *B32B 2262/108* (2013.01); *B60R 19/03* (2013.01); *Y10T 442/674* (2015.04); *Y10T 442/678* (2015.04)

(56) References Cited

U.S. PATENT DOCUMENTS

| | | | | |
|---|---|---|---|---|
| 5,496,602 | A * | 3/1996 | Wai | B29B 11/16 428/298.1 |
| 6,251,206 | B1 * | 6/2001 | Saito | B29B 15/122 118/124 |
| 6,391,436 | B1 * | 5/2002 | Xu | B29C 70/44 428/293.4 |
| 6,875,297 | B1 | 4/2005 | Meuwly et al. | |
| 2002/0019182 | A1 | 2/2002 | Ishibashi et al. | |

FOREIGN PATENT DOCUMENTS

| | | |
|---|---|---|
| JP | H10138379 A | 5/1998 |
| JP | 2005505439 A | 2/2005 |
| JP | 2007083713 A | 4/2007 |
| JP | 2009061718 A | 3/2009 |
| KR | 19990077036 A | 10/1999 |
| KR | 20060116199 A | 11/2006 |
| KR | 20080091781 A | 10/2008 |
| KR | 20100044391 A | 4/2010 |
| KR | 20120056027 A | 6/2012 |
| KR | 20120090780 A | 8/2012 |

OTHER PUBLICATIONS

Korean Notice of Allowance dated Nov. 28, 2015 in connection with the counterpart Korean Patent Application No. 10-2012-0109963.
International Search Report for PCT/KR2013/00855 dated Dec. 24, 2013.
Japanese Office Action dated Apr. 4, 2017 in connection with the counterpart Japanese Patent Application No. 2015-535557.
Offinese Office Action dated Mar. 2, 2016 in connection with the counterpart Chinese Patent Application No. 201380052388.3.

* cited by examiner (a)  (b)

FUNCTIONAL FILM FOR IMPROVING IMPREGNATION PROPERTIES OF COMPOSITE MATERIAL AND METHOD FOR MANUFACTURING COMPOSITE MATERIAL USING SAME

TECHNICAL FIELD

The present invention relates to a film for formation of a composite material and a method for manufacturing a composite material using the same. More particularly, the present invention relates to a film for formation of a composite material, which can exhibit improved impregnation properties using a carrier film including a low-viscosity resin layer formed thereon, and a method for manufacturing a composite material using the same.

BACKGROUND ART

A composite material is used for automotive back beams, bonnets, roofs and the like. The composite material is formed by combination of two or more materials, and has a structure in which one material referred to as a reinforcing phase and having a form of fibers, plates or particles is buried in another material referred to as a matrix phase. A reinforcing material must exhibit high strength and high stiffness and include fibers having a certain length or more. Continuous fibers exhibit excellent mechanical strength, stiffness and impact properties as compared with long fiber-reinforced plastics having a length of 5 mm to 50 mm, such as long fiber-reinforced thermoplastics (LFTs) or glass mat-reinforced thermoplastics (GMTs).

Currently, composite materials having a stack structure of continuous fibers and a thermoplastic film are manufactured in order to maximize mechanical properties of the composite materials. However, there is a problem in that the composite materials do not have satisfactory impregnation properties due to weakened interfacial affinity between the continuous fibers and the thermoplastic film and thus do not reach desired properties.

DISCLOSURE

Technical Problem

The present invention is conceived to solve the above problem in the related art and it is one aspect of the present invention to provide a functional film for formation of a composite material using a carrier film, which includes a low-viscosity resin layer formed on one surface thereof, instead of existing thermoplastic films.

It is another aspect of the present invention to provide a method for manufacturing a composite material exhibiting excellent impregnation properties between continuous fibers and a thermoplastic material using the functional film for formation of a composite material as set forth above.

Technical Solution

In accordance with one aspect of the present invention, a film for formation of a composite material includes: a continuous fiber layer; and a carrier film attached to one surface of the continuous fiber layer and including a low-viscosity resin layer formed on a surface of the carrier film attached to the continuous fiber layer.

In accordance with another aspect of the present invention, a method for manufacturing a composite material includes: (a) forming a low-viscosity resin layer on one surface of a carrier film and manufacturing a film for formation of a composite material by attaching a continuous fiber layer onto the low-viscosity resin layer; (b) forming a resin-impregnated glass fiber layer by impregnating the low-viscosity resin layer into the continuous fiber layer; and (c) compressing the carrier film and the resin-impregnated continuous fiber layer.

Advantageous Effects

According to the present invention, the film for formation of a composite material includes the continuous fiber layer attached to the low-viscosity resin layer formed on one surface of the carrier film, thereby providing a composite material exhibiting excellent impregnation properties and mechanical properties.

In addition, the method according to the present invention employs the film for formation of a composite material as set forth above, thereby providing a composite material exhibiting excellent impregnation properties and mechanical properties.

BEST MODE

Figure 1:
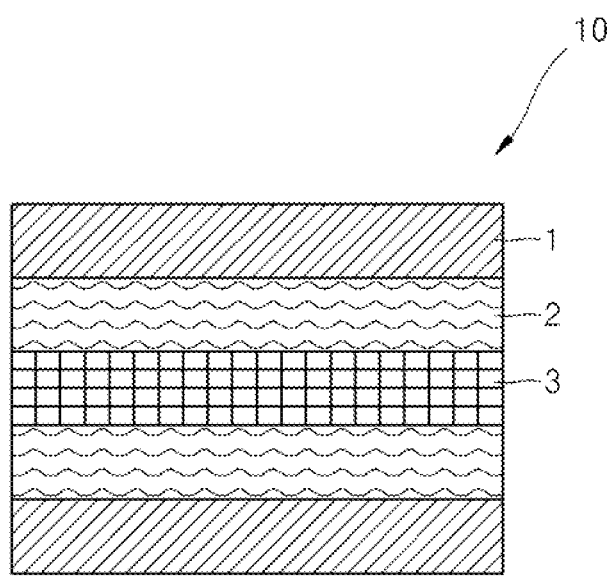
FIG. 1 is a sectional view of a film for formation of a composite material according to one embodiment of the present invention.

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof. Like components will be denoted by like reference numerals throughout the specification.

Hereinafter, a film for formation of a composite material and a composite material prepared using the film according to embodiments of the present invention will be described in detail with reference to the accompanying drawings.

Film for Formation of Composite Material

FIG. 1 is a schematic sectional view of a film 10 for formation of a composite material according to one embodiment of the present invention.

Referring to FIG. 1, the film 10 for formation of a composite material according to the embodiment of the present invention includes a carrier film 1, a low-viscosity resin layer 2 formed on one surface of the carrier film, and a continuous fiber layer 3.

First, although the continuous fiber layer 3 may be any continuous fiber layer used for composite materials typically formed of continuous fiber-reinforced plastics without limitation, the continuous fiber layer 3 may include at least one selected from among organic and inorganic fibers including glass fibers, carbon fibers, basalt fibers, and aramid fibers. In addition, although it is better for the continuous fibers to have a smaller diameter, the continuous fibers may have a diameter from 10 μm to 20 μm. The continuous fiber layer may have a fiber bundle of 600 tex to 2400 tex in consideration of fiber broadening and economic aspects.

Next, the carrier film 1 may be any thermoplastic film formed of a polymer material, and may include at least one selected from among polypropylene, polyethylene, polyester, polyamide, polyethylene terephthalate (PET), polyphenylene sulfide (PPS), polyetheretherketone (PEEK), polylactic acid (PLA), and acrylonitrile butadiene styrene (ABS) copolymers.

The low-viscosity resin layer 2 is formed on one surface of the carrier film 1. The low-viscosity resin layer 2 is formed on a surface of the carrier film 1 attached to the continuous fiber layer 1. A material for the low-viscosity resin layer 2 may be any low-viscosity resin so long as the low-viscosity resin is not in a cured state such as a solid film and exhibits flowability. The material for the low-viscosity resin layer 2 may include at least one selected from among monomers and oligomers, which exhibit compatibility with the carrier film 1. For example, the low-viscosity resin layer 2 may be formed using the same material as the carrier film 1. When the carrier film 1 is a polar material such as polyamide, the low-viscosity resin layer 2 may be formed of a polar material, and when the carrier film 1 is a non-polar material, the low-viscosity resin layer 2 may also be formed of a non-polar material.

According to the present invention, the low-viscosity resin layer 2 may be formed of a prepolymer material without inclusion of a polymer material. For example, the low-viscosity resin layer 2 may be formed of a prepolymer, which can be crosslinked by UV light or heat, or a two-liquid type prepolymer (for example, a urethane prepolymer and a curing agent). Specifically, the low-viscosity resin layer 2 may be formed of a prepolymer of a material including at least one selected from among polypropylene, polyethylene, polyester, polyamide, polyethylene terephthalate (PET), polyphenylene sulfide (PPS), polyetheretherketone (PEEK), polylactic acid (PLA), and acrylonitrile butadiene styrene (ABS) copolymers.

Existing films for formation of a composite material are manufactured by attaching a thermoplastic film to a continuous fiber layer, followed by compression under conditions of high heat and high pressure. This process has a problem in that the thermoplastic film is not sufficiently impregnated into the continuous fiber layer since the continuous fiber layer has a large number of fibers exposed from a surface thereof and thus does not exhibit good interfacial affinity with respect to a surface of the thermoplastic film upon manufacture of the composite materials.

On the other hand, the film for formation of a composite material according to the present invention has a structure in which the low-viscosity resin layer 2 is formed on one surface of the carrier film 1 and attached to the continuous fiber layer 3. That is, since the continuous fiber layer is attached to the carrier film via the low-viscosity resin layer 2 rather than being directly attached to the carrier film, such as a thermoplastic film, the continuous fiber exhibits relatively good interfacial affinity to the carrier film.

According to the present invention, the film for formation of a composite material can form a composite material exhibiting excellent impregnation properties due to the technical feature as set forth above.

Figure 2:
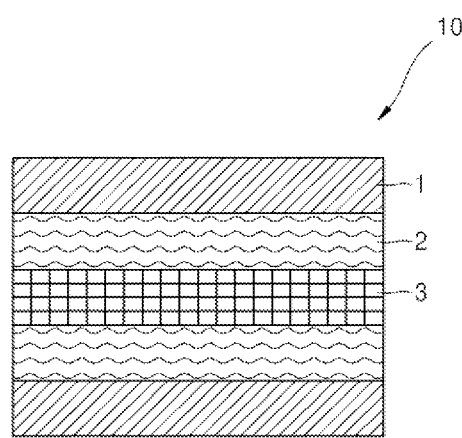
FIG. 2 is a sectional view of a film for formation of a composite material according to another embodiment of the present invention.

FIG. 2 is a schematic sectional view of a film 10' for formation of a composite material according to another embodiment of the present invention.

Referring to FIG. 2, in the film 10' for formation of a composite material according to this embodiment, carrier films 1 are formed on both surfaces of a continuous fiber layer 3, and each of low-viscosity resin layers 2, 2' is formed of a different material. That is, the film for formation of a composite material according to this embodiment of the invention may include two low-viscosity resin layers attached to one surface or both surfaces of the continuous fiber layer, whereby a composite material formed using the film can exhibit better strength and properties.

Figure 3:
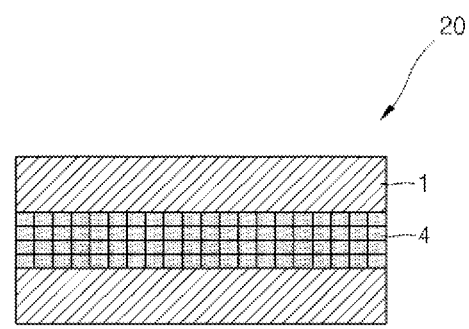
FIG. 3 is a sectional view of a low-viscosity resin layer impregnated into a continuous fiber layer.

FIG. 3 is a sectional view of a film 20 for formation of a composite material, in which a low-viscosity resin layer is impregnated into a continuous fiber layer.

The low-viscosity resin layer may be impregnated into the continuous fiber layer by heat or UV light, whereby a resin-impregnated continuous fiber layer 4 is formed.

In the film for formation of a composite material according to the present invention, the low-viscosity resin layer may be impregnated into the continuous fiber layer first, followed by final compression, thereby providing a composite material exhibiting excellent impregnation properties.

Figure 4:
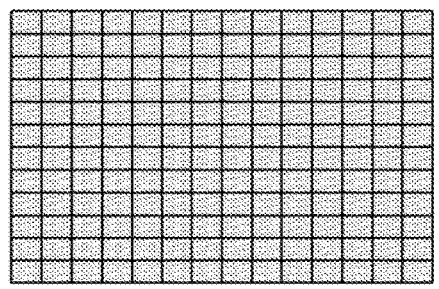
FIG. 4 is sectional views showing impregnation properties of (a) a composition material according to the present invention and impregnation properties of (b) a typical composition material.
Figure 4:
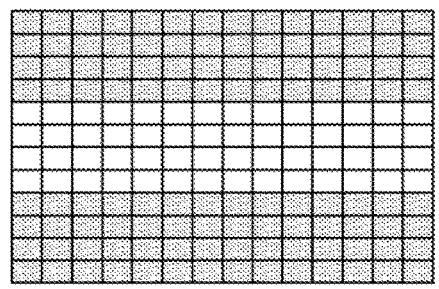

FIG. 4 shows sectional views showing impregnation properties of (a) a composite material according to the invention and impregnation properties of (b) a typical composite material. Referring to FIG. 4, the (a) composite material according to the present invention includes a thermoplastic resin uniformly impregnated into a continuous fiber layer, whereas the (b) typical composite material includes some thermoplastic resins not impregnated into the continuous fiber layer.

Method for Manufacturing Composite Material

According to one embodiment of the invention, a method for manufacturing a composite material includes (a) manufacturing a film for formation of a composite material, (b) forming a resin-impregnated continuous fiber layer, and (c) compressing a carrier film and the resin-impregnated continuous fiber layer.

First, in operation (a), a low-viscosity resin layer is formed on one surface of a carrier film, and a continuous fiber layer is attached onto the low-viscosity resin layer, thereby manufacturing a film for formation of a composite material. The carrier film may include at least one selected from among polypropylene, polyethylene, polyester, polyamide, polyethylene terephthalate (PET), polyphenylene sulfide (PPS), polyetheretherketone (PEEK), polylactic acid (PLA), and acrylonitrile butadiene styrene (ABS) copolymers.

The low-viscosity resin layer may be formed of any low-viscosity resin so long as the low-viscosity resin is not in a cured state such as a solid film and exhibits excellent flowability. The low-viscosity resin layer may include at least one of monomers and oligomers which exhibit excellent compatibility with the carrier film. For example, the low-viscosity resin layer may be formed using the same material as the carrier film. When the carrier film is a polar material such as polyamide, the low-viscosity resin layer may be formed of a polar material, and when the carrier film is a non-polar material, the low-viscosity resin layer may also be formed of a non-polar material.

According to the present invention, the low-viscosity resin layer may be formed of a prepolymer material without inclusion of a polymer material. For example, the low-viscosity resin layer may be formed of a prepolymer, which can be crosslinked by UV light or heat, or a two-phase liquid type prepolymer (for example, a urethane prepolymer and a curing agent). Specifically, the low-viscosity resin layer may be formed of a prepolymer of a material including at least one selected from among polypropylene, polyethylene, polyester, polyamide, polyethylene terephthalate (PET), polyphenylene sulfide (PPS), polyetheretherketone (PEEK), polylactic acid (PLA), and acrylonitrile butadiene styrene (ABS) copolymers.

Here, the low-viscosity resin layer may be formed by any method known in the art. For example, the low-viscosity resin layer may be formed by coating a low-viscosity resin onto one surface of the carrier film.

Alternatively, low-viscosity resin layers may be formed of different materials on two carrier films, and then attached to both surfaces of the continuous fiber layer, respectively.

Next, in operation (b), the low-viscosity resin layer is impregnated into the continuous fiber layer, thereby forming a resin-impregnated continuous fiber layer. Here, the low-viscosity resin layer is impregnated into the continuous fiber layer by heating the film for formation of a composite material or irradiating the film with UV light. Specifically, the resin-impregnated continuous fiber layer may be formed at a temperature of 50° C. to 100° C., or may be formed by irradiation with UV light having suitable energy for properties of a resin for forming the low-viscosity resin layer. If the temperature is less than 50° C., there is a problem in that the low-viscosity resin is not sufficiently impregnated into the fiber layer, and if the temperature is greater than 100° C., there can be a problem in manufacture due to excessive softness of the low-viscosity resin.

Finally, in operation (c), the carrier film and the resin-impregnated continuous fiber layer are compressed to each other, thereby providing a final composite material.

Compression may be performed using a press or the like, and may be performed at a temperature of 100° C. to 380° C.

Through a series of the processes as set forth above, a composite material exhibiting excellent impregnation properties and mechanical properties can be manufactured.

Hereinafter, the present invention will be explained in more detail with reference to some examples. It should be understood that these examples are not to be construed in any way as limiting the present invention.

Preparation of Composite Material

Example 1

A glass fiber layer having an average diameter of 17 μm and a fiber bundle of 2400 tex was formed. Next, two carrier films including polypropylene as a main component were formed, and a low-viscosity resin layer including propylene in monomer and oligomer states as a main component was formed on one surface of each of the carrier films.

Next, a film for formation of a composite material was manufactured by attaching the low-viscosity resin layers to both surfaces of the glass fiber layer, followed by heating the film to 80° C. to impregnate the low-viscosity resin layers into the continuous fiber layer. Next, a composite material was prepared by compressing the film using a press at 200° C.

Example 2

A composite material was prepared in the same manner as in Example 1 except that a low-viscosity resin layer including a polyester-based urethane prepolymer and a curing agent (hexamethylene diisocyanate) as a main component was formed.

Comparative Example 1

A glass fiber layer having an average diameter of 17 μm and a fiber bundle of 2400 tex was formed, and two plastic films including polypropylene as a main component were prepared.

Next, the plastic films were attached to both surfaces of the glass fiber layer, followed by compression using a press at 200° C., thereby preparing a composite material.

<Evaluation>

Each of the composite materials prepared in Examples and Comparative Example was subjected to evaluation of mechanical properties.

Evaluation of the mechanical properties was performed by measuring tensile strength and bending strength of each of the composite materials, followed by comparison. The composite materials were sorted into a composite material exhibiting excellent mechanical properties and a composite material exhibiting ordinary mechanical properties, based on measurement results of tensile strength and bending strength of each of the composite materials. Tensile strength was measured in accordance with ASTM D3039, and bending strength was measured in accordance with ASTM D790.

TABLE 1

|  | Tensile strength ($N/mm^2$) | Bending strength ($N/mm^2$) | Mechanical properties |
|---|---|---|---|
| Example 1 | 458 | 401 | Excellent |
| Example 2 | 448 | 404 | Excellent |
| Comparative Example | 428 | 382 | Ordinary |

Referring to Table 1, it could be confirmed that the composite materials of Examples 1 and 2 exhibited superior mechanical properties to that of Comparative Example.

That is, the composite materials of Examples 1 and 2 according to the present invention included the low-viscosity resin layer and thus exhibited superior resin impregnation properties to that of Comparative Example. Therefore, it could be seen that the composite materials of Examples exhibited superior mechanical properties to that of Comparative Example.

Although the present invention has been described with reference to some embodiments, it should be understood that the embodiments are provided for illustrative purposes only, and that various modifications, changes, alterations, and equivalent embodiments can be made by those skilled in the art without departing from the spirit and scope of the invention. Therefore, the scope of the invention should be limited only by the accompanying claims and equivalents thereof.

LIST OF REFERENCE NUMERALS

1: Carrier film
2, 2': Low-viscosity resin layer
3: Continuous fiber layer
4: Resin-impregnated continuous fiber layer
10, 10', 20: Film for formation of composite material

The invention claimed is:

1. A film comprising:
a continuous fiber layer having a first surface and a second surface opposite to the first surface;
a first resin layer attached on the first surface of the continuous fiber layer, the first resin layer comprising a first prepolymer;
a first carrier film on the first resin layer, the first carrier film comprising a first thermoplastic polymer compatible with the first prepolymer;
a second resin layer attached on the second surface of the continuous fiber layer, the second resin layer comprising a second prepolymer; and
a second carrier film on the second resin layer, the second carrier film comprising a second thermoplastic polymer compatible with the second prepolymer,
wherein the first prepolymer and the second prepolymer are different prepolymers, each of the first and the second prepolymer comprises a prepolymer of at least one selected from among, polypropylene, polyethylene terephthalate (PET), polyphenylene sulfide (PPS), polyetheretherketone (PEEK), polylactic acid (PLA), and the continuous fiber layer comprises a fiber bundle of 600 tex to 2400 tex.

2. The film according to claim 1, wherein the first and the second prepolymers comprise at least one of monomers and oligomers having compatibility with the carrier film.

3. The film according to claim 1, wherein the first resin layer and the second resin layer are impregnated into the continuous fiber layer by heat or UV light.

4. The film according to claim 1, wherein the continuous fiber layer comprises at least one selected from among organic and inorganic fibers comprising glass fibers, carbon fibers, basalt fibers, and aramid fibers.

5. The film according to claim 1, wherein each of the first and the second thermoplastic polymer comprises at least one selected from among polypropylene, polyethylene, polyester, polyamide, polyethylene terephthalate (PET), polyphenylene sulfide (PPS), polyetheretherketone (PEEK), polylactic acid (PLA), and acrylonitrile butadiene styrene (ABS) copolymers.

* * * * *